United States Patent [19]

Fenton

[11] Patent Number: 4,469,612
[45] Date of Patent: Sep. 4, 1984

[54] AGGLOMERATION OF MINERAL-DERIVED FINES

[75] Inventor: Donald M. Fenton, Anaheim, Calif.

[73] Assignee: Union Oil Company of California, Brea, Calif.

[21] Appl. No.: 436,772

[22] Filed: Oct. 26, 1982

[51] Int. Cl.³ .............................................. C09K 3/22
[52] U.S. Cl. .................................... 252/88; 252/174.24
[58] Field of Search ............................ 252/88, 174.24

[56] References Cited

U.S. PATENT DOCUMENTS

| | | | |
|---|---|---|---|
| 3,563,795 | 2/1971 | Williams et al. | 428/272 |
| 3,954,662 | 5/1976 | Salyer et al. | 252/88 |
| 4,067,818 | 1/1978 | Marin | 252/88 |

FOREIGN PATENT DOCUMENTS 530730  9/1956  Canada .................................. 252/88

*Primary Examiner*—Paul Lieberman
*Assistant Examiner*—Robert A. Wax
*Attorney, Agent, or Firm*—Denton L. Anderson; Yale S. Finkle; Dean Sandford

[57] ABSTRACT

Mineral-derived fines are contacted with a polymeric material to agglomerate the fines. The agglomerating polymeric materials are the homopolymers and salts of homopolymers of acrylic acid and methacrylic acid, the copolymers and salts of copolymers of acrylic acid with methacrylic acid, and the copolymers and salts of copolymers of one or more monomers of acrylic acid and methacrylic acid together with any one or more monomers selected from the group consisting of acrylamide, methacrylamide, acrylonitrile, methacrylonitrile, styrene, N,N-dimethylacrylamide, vinyl acetate, and monomers having the structural formula:

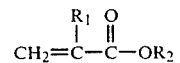

where $R_1$ is hydrogen or a methyl group and $R_2$ is an alkyl radical, alkoxyalkyl radical, hydroxyalkyl radical, or aminoalkyl radical, having from 1 to 20 carbon atoms.

20 Claims, No Drawings

AGGLOMERATION OF MINERAL-DERIVED FINES

BACKGROUND OF THE INVENTION

The invention relates to the agglomeration of mineral-derived fines, and more particularly to the agglomeration of oil shale fines.

Minerals are solid crystalline elements or compounds, often highly valuable, which are mined or quarried and then fashioned into desired products. The mining and working of minerals results in the formation of dust or particulate matter known as fines. Fines are now being recognized as detrimental to the environment and the health of persons working with these materials. Moreover, the loss of the mineral content of fines results in the less than total utilization of the earth's finite resources.

The effects of fines on the environment are manifold. Particulate matter is easily carried by air currents high into the atmosphere, only later to be deposited on vegetation and housing, often bringing with it undesirable toxic and reactive substances which are harmful to vegetation and may cause accelerated aging of roofing and protective paint applied to housing. Fines also present a problem in the disposal of spent mineral wastes. The small size of these particles may destabilize any landfill site in which they are deposited; additionally, fines may leach out of the landfill site, thereby damaging the environment far beyond the geographical confines of the landfill site.

Occupational health hazards have long been recognized as being associated with the inhalation of dust by coal miners and steel workers. A disease state known as "pneumoconiosis" has been identified which encompasses health problems having their etiology in dust inhalation. Pneumoconiosis, or dust on the lungs, has been found to induce lesions on the bronchioles, permanent dilation of small airways in the lungs, and loss of elasticity of lung tissue. Any toxic nature of inhaled mineral-derived dust would dramatically increase the health hazards accompanying inhalation. For example, is arsenic is present in inhaled dust, prolonged inhalation could result in arsenic poisoning.

The fines which are produced by mining, working, or transporting materials can represent a substantial fraction of the potential value of the minerals removed from the earth. For example, in the crushing of oil shale into small particulates, a necessary step before retorting to extract the hydrocarbon content, up to 20 percent of the weight of the oil shale is ground into fines. A loss of these proportions of oil shale represents a significant inefficiency in the extraction of hydrocarbons therefrom, and runs counter to the pressing need for the conservation of natural resources.

The patent literature has recognized environmental, health, and conservation problems related to the production of fines in the mining and working of minerals. United Kingdom Pat. No. 677,279 describes spraying dusty areas with aqueous liquids containing alkyl benzene sulphonates in which the alkyl group contains from 10 to 12 carbon atoms. U.S. Pat. No. 4,067,818 issued to Marin discloses a formulation for laying dust containing up to 2 percent by weight of an alkyl orthoxylene sulphonate.

The present energy shortage has brought about renewed interest in oil shale, a sedimentary mineral formation comprising marlstone deposits with layers containing an organic polymer called kerogen which upon heating decomposes to produce liquid and gaseous hydrocarbon products capable of being refined into a useful energy source. Oil shale is mined by conventional techniques, including drilling and blasting of the mineral formation. The mined oil shale is crushed to reduce the size of the shale to aid in material handling and to reduce the time for retorting. Unfortunately, in the above processes there is little or no control over the resulting size distribution of shale, thereby leading to the formation of a considerable quantity of oil shale fines.

A need remains for a simple inexpensive method for controlling mineral-derived fines. Such a method would preferably be useable under the adverse condition found in the mining and working of minerals.

Accordingly, it is an object of the present invention to provide a method for agglomerating mineral-derived fines.

Another object is to provide a method for agglomerating oil shale-derived fines.

These and other objects and advantages of the invention will be apparent to those skilled in the art in view of the following description of the invention.

SUMMARY OF THE INVENTION

In accordance with the present invention, mineral-derived fines are agglomerated by contact with a liquid comprising (1) water and (2) a polymeric material selected from the group consisting of the homopolymers and salts of homopolymers of acrylic acid and methacrylic acid, the copolymers and salts of copolymers of acrylic acid with methacrylic acid, and the copolymers and salts of copolymers of one or more monomers of acrylic acid and methacrylic acid together with any one or more monomers selected from the group consisting of acrylamide, methacrylamide, acrylonitrile, methacrylonitrile, styrene, N,N-dimethylacrylamide, vinyl acetate, and monomers having the structural formula:

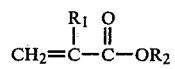

where $R_1$ is hydrogen or a methyl group and $R_2$ is an alkyl radical, alkoxyalkyl radical, hydroxyalkyl radical, or aminoalkyl radical, having from 1 to 20 carbon atoms, said polymeric material being present in the liquid in a concentration such that the liquid is more effective than water for agglomerating fines.

DETAILED DESCRIPTION OF THE INVENTION

In accordance with this invention, mineral-derived fines are controlled or agglomerated by contact with an aqueous liquid containing a polymeric material. As used herein, the term "fines" refers to finely crushed or powdered material having a maximum cross-sectional dimensions of ¼ inch or less. The fines to which this invention relates are derived from minerals, such as, for example, stone, coal, and/or oil shale. The fines are usually formed when the minerals are worked, i.e., when mined, ground, polished, crushed, or transported. The most useful results obtained by the practice of this invention are achieved with mineral derived fines containing a cation that will react with a polymer containing an acidic functionality to form a salt, or will react with the salt of a polymer to form a more stable salt. The fines preferably will contain calcium ions, magnesium ions, sodium ions, or ferrous ions.

In the practice of this invention, a liquid containing the polymeric material is prepared having a low viscosity for ease of application to fines and an effective level of agglomerating activity. Preferably, the liquid is prepared by adding the polymeric material to water, forming a solution, an emulsion, or suspension. Preferred concentrations of polymeric material in water range from about 0.05 gram to about 5 grams per liter of liquid; highly preferred concentrations range from about 0.07 gram to about 1 gram of polymeric material per liter of liquid. Suitably, the concentration of polymeric material in the liquid is more effective than water for agglomerating mineral derived fines.

Suitably, the liquid used in the invention has a pH ranging from about 5.0 to about 13.0. Preferably, the liquid has a pH from about 5.0 to about 9.0, and most highly preferably from about 7.0 to about 9.0. The pH may be varied by the addition of an acid or base to the liquid. For example, the pH may be adjusted by the addition of sodium hydroxide, calcium hydroxide, sulfuric acid, or hydrochloric acid. Additionally, the liquid used in this invention may be heated or cooled to adjust to a viscosity that will allow facile application.

The polymeric materials used in this invention are capable of agglomerating mineral derived fines. The agglomerating polymeric materials are the homopolymers and salts of homopolymers of acrylic acid and methacrylic acid, the copolymers and salts of copolymers of acrylic acid with methacrylic acid, and the copolymers and salts of copolymers of one or more monomers of acrylic acid and methacrylic acid together with any one or more monomers selected from the group consisting of acrylamide, methacrylamide, acrylonitrile, methacrylonitrile, styrene, N,N-dimethylacrylamide, vinyl acetate, and monomers having the structural formula:

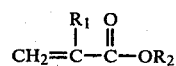

where $R_1$ is hydrogen or a methyl group and $R_2$ is an alkyl radical, alkoxyalkyl radical, hydroxyalkyl radical, or aminoalkyl radical, having from 1 to 20 carbon atoms. The polymeric materials used in this invention suitably have a weight average molecular weight ranging from about one thousand to about ten million, preferably from about one million to about three million. Useful salts of polyacrylic acid and salts of copolymers derived in part from acrylic acid include the ammonium, sodium, potassium, lithium, and tetramethyl ammonium species, and useful salts of polymethacrylic acid and salts of copolymers derived in part from methacrylic acid are the ammonium, sodium, potassium, lithium and tetramethyl ammonium forms. Other polymeric materials useful in this invention are the copolymers and salts of copolymers derived from acrylic acid and/or methacrylic acid and monomers of acrylonitrile, methacrylonitrile, styrene, N,N-dimethylacrylamide, and vinyl acetate. Suitable polymeric materials are copolymers derived from acrylic acid and/or methacrylic acid together with any one or more monomers of acrylamide and monomers represented by the following formula:

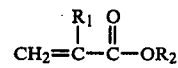

where $R_1$ is hydrogen or a methyl group and $R_2$ is an alkyl radical, alkoxyalkyl radical, hydroxyalkyl radical, or aminoalkyl radical, having from 1 to 20 carbon atoms. Polymeric materials which are preferred in the practice of this invention are the homopolymers an copolymers of acrylic acid and methacrylic acid.

The polymeric materials used in this invention are added into water by any suitable method, as for example, in a batch process or in a continuous process. The polymeric materials may be added either individually or as a combined system. The liquid used in this invention may be immediately utilized in its intended application, or it may be satisfactorily stored for extended periods of time and thereafter utilized in the desired application.

Mineral-derived fines are contacted with the liquid used in this invention by any convenient method, for example, spraying or atomizing the liquid, or immersing the fines in the liquid. Spraying and atomizing (the reduction of the liquid to a fine mist) are accomplished by techniques well known in the art, such as by the use of compressed air sprayers, motor driven sprayers, or gravity flow sprayers. The compressed air sprayer operates by impinging high-velocity turbulent air on the surface of filaments or films or liquid causing them to collapse to droplets with a wide range of sizes. Motor-driven sprayers or rotary atomizers contain spinning discs on which the liquid of the invention is spread in a uniform film and accelerated at 90 degrees to the axis. In a gravity flow sprayer, the energy to create the spray is derived from the force of gravity on the liquid used in the invention. The force of gravity drives the liquid through a nozzle having an orifice shaped so as to break up the liquid into streams of droplets. Finally, contact by immersion is accomplished by dipping the mineral-derived fines in a tank containing the liquid used in this invention and withdrawing the fines from the tank, thereby allowing the excess liquid to drain from the fines.

The liquid used in this invention may be contacted with mineral-derived fines at any suitable point at which the agglomeration of fines is desired—such as after mining, after crushing, after retorting, prior to transporting, and prior to storage. For example, retorting oil shale produces a substantially inorganic residue, generally called "spent oil shale", which is transported to a site where it is revegetated. The spent shale usually closely resembles the original raw oil shale in physical size and texture, but is chemically quite different. In addition to differences in hydrocarbon content between raw oil shale and spent oil shale, spent shale is sometimes more alkaline than raw shale. The alkalinity of spent shale may be used to advantage in agglomerating the fines which have been retorted. The alkaline nature of the retorted fines may be used to increase the alkalinity of the liquid used in this invention as it is contacted with spent shale. For example, a water-polyacrylic acid mixture may be prepared having a pH of 5.0. By spraying the water-polyacrylic acid mixture on the spent shale, the alkaline nature of the spent shale will neutralize the water-polyacrylic acid mixture, thereby making the water-polyacrylic acid mixture more alkaline and increasing fines agglomeration. The above-described process lowers the pH of the spent shale, thereby aiding in revegetation.

Although the invention is not to be held to any particular theory of operation, the liquid containing the polymeric material contacted with mineral-derived fines, as described above, is believed to gradually be converted from the liquid state to the solid state, yet agglomeration activity will be effected before complete solidification is reached. Thus, in the preferred embodiment of the invention, the polymeric material is induced to quickly convert from the liquid to the solid state, as for example, by rapidly passing air over the mineral-derived fines freshly contacted with the liquid used in the invention.

This invention is most advantageously applied to fines derived from oil shale. Crushed oil shale contains a significant quantity of particulate matter capable of passing through a screen having a mesh size of ¼ inch. When contacted with tap water, the quantity of shale fines capable of passing through a screen having a ¼ inch mesh is significantly reduced, as for example, to 460 milligrams for each 100 grams of crushed oil shale which is treated. In the practice of this invention, however, it will be found that the quantity of fines capable of passing through a screen having a ¼ inch mesh will be reduced far more significantly, as for example, to as little as 115 milligrams for each 100 grams of crushed oil shale which is treated.

In the following example, a method for practicing the present invention and a comparison illustrating the efficacy of the invention are presented. The example, however, is not to be construed as limiting the scope of the invention, which is defined by the claims.

EXAMPLE

A solution of polyacrylic acid and tap water is prepared and the pH adjusted to a desired value by the addition of sodium hydroxide. One hundred milliliters of the solution are added to a wide-mouth glass bottle. One hundred grams of crushed oil shale from the Green River formation of Colorado are added to the wide-mouth bottle containing the polyacrylic acid solution, thereby immersing all of the crushed oil shale in the polyacrylic acid solution. The polyacrylic acid solution is decanted from the wide-mouth bottle after 5 minutes of contact with the oil shale. The treated oil shale is spread on a screen having a mesh size of ¼ inch. The fines are sifted through the screen and the weight of the fines measured. The process is repeated at several concentrations of polyacrylic acid in tap water and at various hydrogen ion concentrations. The results are summarised in Table I. For comparison purposes, a sample of the same crushed oil shale is treated as described above with the exception that no polyacrylic acid is present in the water. The effectiveness of solutions of polyacrylic acid in agglomerating fines and thereby preventing them from passing through a ¼ inch screen mesh is demonstrated by the experimental results presented in Table I.

TABLE I

| Concentration of Polyacrylic Acid (grams per liter) | pH | Weight of Fines (milligrams) |
|---|---|---|
| 0 | 6.0 | 460 |
| 50 | 6.0 | 3414 |
| 10 | 8.5 | 759 |
| 0.1 | 6.0 | 198 |
| 0.1 | 8.5 | 115 |

TABLE I-continued

| Concentration of Polyacrylic Acid (grams per liter) | pH | Weight of Fines (milligrams) |
|---|---|---|
| 0.01 | 6.0 | 921 |
| 0.01 | 8.5 | 800 |

The results shown in Table I indicate that solutions of polyacrylic acid having a concentration of 0.1 gram per liter are effective in minimizing fines, and that polyacrylic acid at a concentration of 0.1 gram per liter and a pH of 8.5 is most effective. Moreover, the data indicate that the invention is more effective than water in agglomerating fines by a factor greater than 2 or 3, depending on the pH.

While particular embodiments of the invention have been described, it will be understood, of course, that the invention is not limited thereto since many obvious modifications can be made, and it is intended to include within this invention any such modifications as will fall within the scope of the appended claims.

Having now described the invention, I claim:

1. A method for agglomerating oil shale-derived fines wherein said oil shale-derived fines are contacted with a liquid comprising (1) water and (2) a polymeric material selected from the group consisting of homopolymers and salts of homopolymers of acrylic acid and methacrylic acid, copolymers and salts of copolymers of acrylic acid with methacrylic acid and the copolymers and salts of copolymers of one or more monomers of acrylic acid and methacrylic acid together with any one or more monomers selected from the group consisting of acrylamide, methacrylamide, acrylonitrile, methacrylonitrile, styrene, N,N-dimethylacrylamide, vinyl acetate, and monomers having the structural formula:

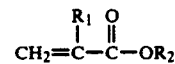

where $R_1$ is hydrogen or a methyl group and $R_2$ is an alkyl radical, alkoxyalkyl radical, hydroxyalkyl radical, or aminoalkyl radical, having from 1 to 20 carbon atoms, said polymeric material being present in said liquid in a concentration between about 0.05 gram per liter of liquid to about 5.0 grams per liter of liquid.

2. The method defined in claim 1 wherein said fines are contacted with said liquid by spraying said liquid on to said fines.

3. The method defined in claim 1 wherein said fines are contacted with said liquid by immersion in said liquid.

4. The method defined in claim 1 wherein said liquid is atomized so as to contact said fines.

5. The method defined in claim 1, 2, 3, or 4 wherein said fines have a maximum cross-sectional dimension of about ¼ inch or less.

6. A method for agglomerating oil shale-derived fines wherein said fines are contacted with a liquid comprising (1) water and (2) polyacrylic acid, said liquid containing said polyacrylic acid in a concentration between about 0.05 gram per liter of liquid to about 5.0 grams per liter of liquid.

7. The method defined in claim 6 wherein said liquid contains a polyacrylic acid concentration from between about 0.07 gram per liter of liquid to about 1 gram per liter of liquid.

8. The method defined in claim 6 wherein said polyacrylic acid has a weight average molecular weight from about one thousand to about ten million.

9. The method defined in claim 6 wherein said liquid has a pH from about 7.0 to about 13.0.

10. The method defined in claim 6 wherein said liquid has a pH from about 5.0 to about 9.0.

11. The method defined in claim 6 wherein said liquid is combined with a basic material resulting in a pH between about 7.0 to about 9.0.

12. The method defined in claim 6 wherein said fines are contacted with said liquid by spraying said liquid on to said fines.

13. The method defined in claim 6 wherein said fines are contacted with said liquid by atomizing said liquid on to said fines.

14. The method defined in claim 6 wherein said fines are contacted with said liquid by immersion in said liquid.

15. The method defined in claim 6, 7, 9, or 14 wherein said fines will pass through a screen having about a ¼ inch mesh.

16. The method defined in claim 6 wherein said liquid contains a polyacrylic acid concentration of about 0.1 gram per liter of liquid.

17. The method defined in claim 6 wherein said liquid has a pH of about 8.5.

18. The method defined in claim 16 wherein said liquid has a pH of about 8.5.

19. A method for agglomerating oil shale-derived fines wherein said fines are contacted with a liquid consisting essentially of (1) water and (2) a polymeric material selected from the group consisting of homopolymers and salts of homopolymers of acrylic acid and methacrylic acid, copolymers and salts of copolymers of acrylic acid with methacrylic acid and the copolymers and salts of copolymers of one or more monomers of acrylic acid and methacrylic acid together with any one or more monomers selected from the group consisting of acrylamide, methacrylamide, acrylonitrile, methacrylonitrile, styrene, N,N-dimethylacrylamide, vinyl acetate, and monomers having the structural formula:

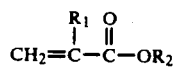

where $R_1$ is hydrogen or a methyl group and $R_2$ is an alkyl radical, alkoxyalkyl radical, hydroxyalkyl radical, or aminoalkyl radical, having from 1 to 20 carbon atoms, said polymeric material being present in said liquid in a concentration between about 0.5 gram per liter of liquid to about 5.0 grams per liter of liquid.

20. A method as defined in claim 1 wherein said polymeric material is present in said liquid in a concentration between about 0.07 gram per liter of liquid and about 1.0 gram per liter of liquid.

* * * * *